(12) United States Patent
Tai et al.

(10) Patent No.: US 7,536,859 B2
(45) Date of Patent: May 26, 2009

(54) APPARATUS FOR WAVE ENERGY HARNESSING

(75) Inventors: Chun-I Tai, No. 377, Fongjia Rd., Fongshan City, Kaohsiung County (TW); Wen-Chung Huang, Fongshan (TW); Cheng-Hsing Lai, Jhonghe (TW)

(73) Assignee: Chun-I Tai, Fongshan (TW)

( * ) Notice: Subject to any disclaimer, the term of this patent is extended or adjusted under 35 U.S.C. 154(b) by 0 days.

(21) Appl. No.: 12/018,236

(22) Filed: Jan. 23, 2008

(65) Prior Publication Data

US 2008/0190105 A1    Aug. 14, 2008

(30) Foreign Application Priority Data

Feb. 13, 2007    (TW) .............................. 96105225 A (51) Int. Cl.
     *F03B 13/18*    (2006.01)
     *F03B 17/02*    (2006.01)
     *F03B 13/10*    (2006.01)
     *H02P 9/04*    (2006.01)

(52) U.S. Cl. .............................. 60/497; 60/496; 60/499; 60/507; 290/42; 290/53

(58) Field of Classification Search .................. 60/495, 60/496, 497, 498, 502, 503, 504, 505; 290/42, 290/53; 220/720
See application file for complete search history.

(56) References Cited

U.S. PATENT DOCUMENTS

| | | | | |
|---|---|---|---|---|
| 2,783,022 A | * | 2/1957 | Salzer | 60/505 |
| 2,879,735 A | * | 3/1959 | Pointer | 114/266 |
| 5,083,847 A | * | 1/1992 | Peters | 312/322 |
| 5,597,034 A | | 1/1997 | Barker, III et al. | |
| 5,762,710 A | * | 6/1998 | Ngai et al. | 118/300 |
| 6,945,315 B1 | | 9/2005 | Gektin et al. | |
| 7,012,340 B2 | | 3/2006 | Yi | |
| 7,213,398 B2 | * | 5/2007 | Takeuchi | 60/495 |
| 2001/0052733 A1 | | 12/2001 | Fujii et al. | |
| 2008/0016863 A1 | * | 1/2008 | Tai et al. | 60/497 |

FOREIGN PATENT DOCUMENTS

TW           547434         8/2003

\* cited by examiner

*Primary Examiner*—Thomas E Denion
*Assistant Examiner*—Christopher Jetton
(74) *Attorney, Agent, or Firm*—Alan Kamrath; Kamrath & Associates PA (57) ABSTRACT

An apparatus for wave energy harnessing includes at least one slide shaft, a buoyant unit, an energy-transmitting unit, and a rotate unit. The slide shaft is firmly mounted on the seabed. The buoyant unit is movably engaged with the slide shaft and has a reservoir and an adjusting board, so as to control the vertical position of the buoyant unit relative to sea level. The energy-transmitting unit is mounted on the buoyant unit. The rotate unit rotatably engages with the energy-transmitting unit and connects with an energy-transforming unit through a transmission shaft. Thereby, the buoyant unit is driven by waves to vertically slide along the slide shaft, the energy-transmitting unit rotates the transmission shaft of the rotate unit, and, thus, the energy-transforming unit generates power.

13 Claims, 10 Drawing Sheets

APPARATUS FOR WAVE ENERGY HARNESSING

BACKGROUND OF THE INVENTION

1. Field of the Invention

The present invention relates to an apparatus for wave energy harnessing and, particularly, to an apparatus providing a buoyant unit and at least one transmission shaft, with the at least one transmission shaft being actuated by vertical movement of the buoyant unit to harness wave energy.

2. Description of the Related Art

A conventional apparatus for wave energy harnessing, as described in Taiwanese Patent Publication No. 547434, entitled "WAVE ENERGY BOAT", is installed on a boat body and includes a buoyant unit and a gearing mechanism. A rack member and a plurality of slide shafts are provided on the buoyant unit, with the rack member engaging with the gearing mechanism. Each of the slide shafts is slidably received in a sleeve member such that the slide shafts can guide vertical movement of the buoyant unit.

The gearing mechanism includes a plurality of driving gears, a plurality of driven gears and a transmission shaft. Once assembled, the driving gears and the driven gears are mechanically engaged with each other. Furthermore, the driving gears are mechanically engaged with the rack member of the buoyant unit so that the vertical movement, which may include upward and downward movements, of the buoyant unit can rotate the transmission shaft in the same direction. When the boat body is disposed in water, waves of the water can cause a certain extent of vertical reciprocation of the buoyant unit for operating the apparatus.

In operation, any upward or downward movement of the buoyant unit can cause rotational movement of the transmission shaft via the gearing mechanism so that wave energy is converted into mechanical energy. In this case, the transmission shaft may further mechanically connect with a power generator and a battery device. Accordingly, mechanical energy is converted into electric energy and stored in the battery device.

Generally, a number of design limitations exist for this conventional power generating apparatus due to its complicated structure in manufacturing and problematic aspects which naturally occur during use. With regard to the manufacture of such a complicated structure of the gearing mechanism, the arrangement of the driving and driven gears is complicated and subject to limitations in assembly and maintenance.

Another problem with the operation of the buoyant unit is due to the fact that four of the slide shafts are arranged at four corners of the buoyant float unit. In reciprocating operation, there are inconsistent movements among the four slide shafts that may affect the movement of the buoyant unit. Disadvantageously, the slide shafts and the sleeve members thereof are susceptible to distortion and loss in function after long-term use.

Another problem with the operation of the power generating apparatus is due to the fact that the entire apparatus is installed on the boat body. Accordingly, the boat body and the buoyant unit move synchronously in the same direction, which may cause loss of efficiency of the movement of the buoyant unit. In other words, there is a limitation existing for the distance of the movement of the buoyant unit. In addition to the mentioned disadvantage, electricity generated from the power generating apparatus can only be stored in its battery device and cannot directly be transmitted to a power station or power distribution system. Hence, there is a need for improving such a mobile structure of the apparatus.

SUMMARY OF THE INVENTION

The primary objective of this invention is to provide an apparatus for wave energy harnessing, wherein a buoyant unit slidably engages with at least one slide shaft and mounts an energy-transmitting unit for a rotate unit to be received and engaged in the energy-transmitting unit. Therefore, the buoyant unit is driven to move in a vertical direction by waves, and kinetic energy of the buoyant unit can be transformed into a rotational kinetic energy of the rotate unit. Accordingly, the efficiency of power generating over wave energy is high.

The secondary objective of this invention is to provide the apparatus for wave energy harnessing, wherein the buoyant unit further comprises an adjusting tank having an inner space for providing a stable movement of the buoyant unit. Accordingly, no matter whether the wave is regular or not, regular power is generated.

Another objective of this invention is to provide the apparatus for wave energy harnessing, wherein a stabilization unit is further provided for the buoyant unit to smoothly slide along the slide shaft. Accordingly, the efficiency of power generating over wave energy is further improved.

The apparatus for wave energy harnessing in accordance with an aspect of the present invention includes at least one slide shaft, a buoyant unit, an energy-transmitting unit, and a rotate unit. Said at least one slide shaft is firmly mounted on seabed. The buoyant unit is movably engaged with the slide shaft and has a reservoir and an adjusting board, so as to control the vertical position of the buoyant unit relative to sea level. The energy-transmitting unit is mounted on the buoyant unit. The rotate unit rotatably engages with the energy-transmitting unit and connects with an energy-transforming unit through a transmission shaft. Thereby, the buoyant unit is driven by waves to vertically slide along the at least one slide shaft, the energy-transmitting unit rotates the transmission shaft of the rotate unit, and, thus, the energy-transforming unit generates power.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
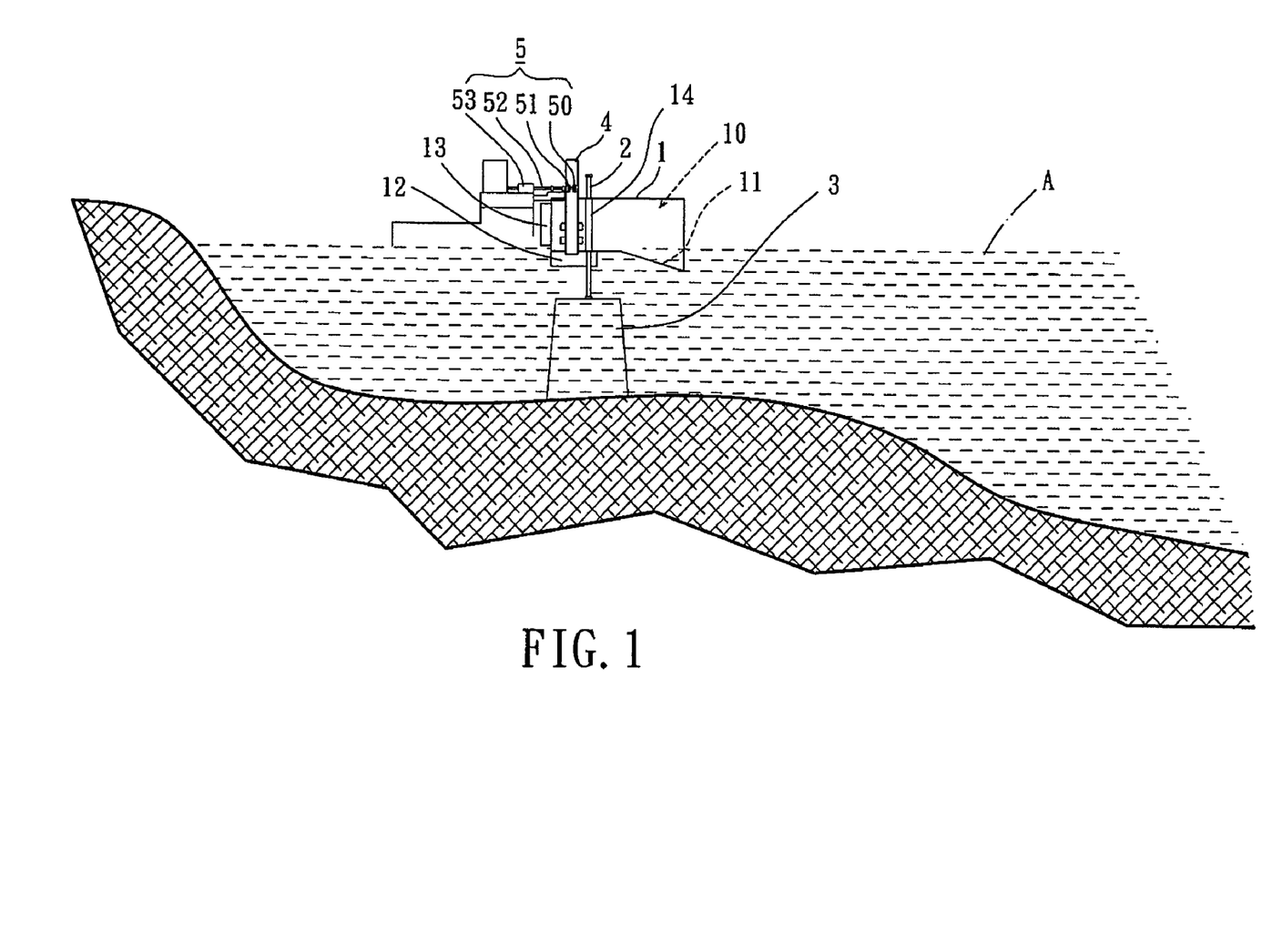
FIG. 1 is a schematic view illustrating an apparatus for wave energy harnessing in accordance with the first embodiment of the present invention.
Figure 2:
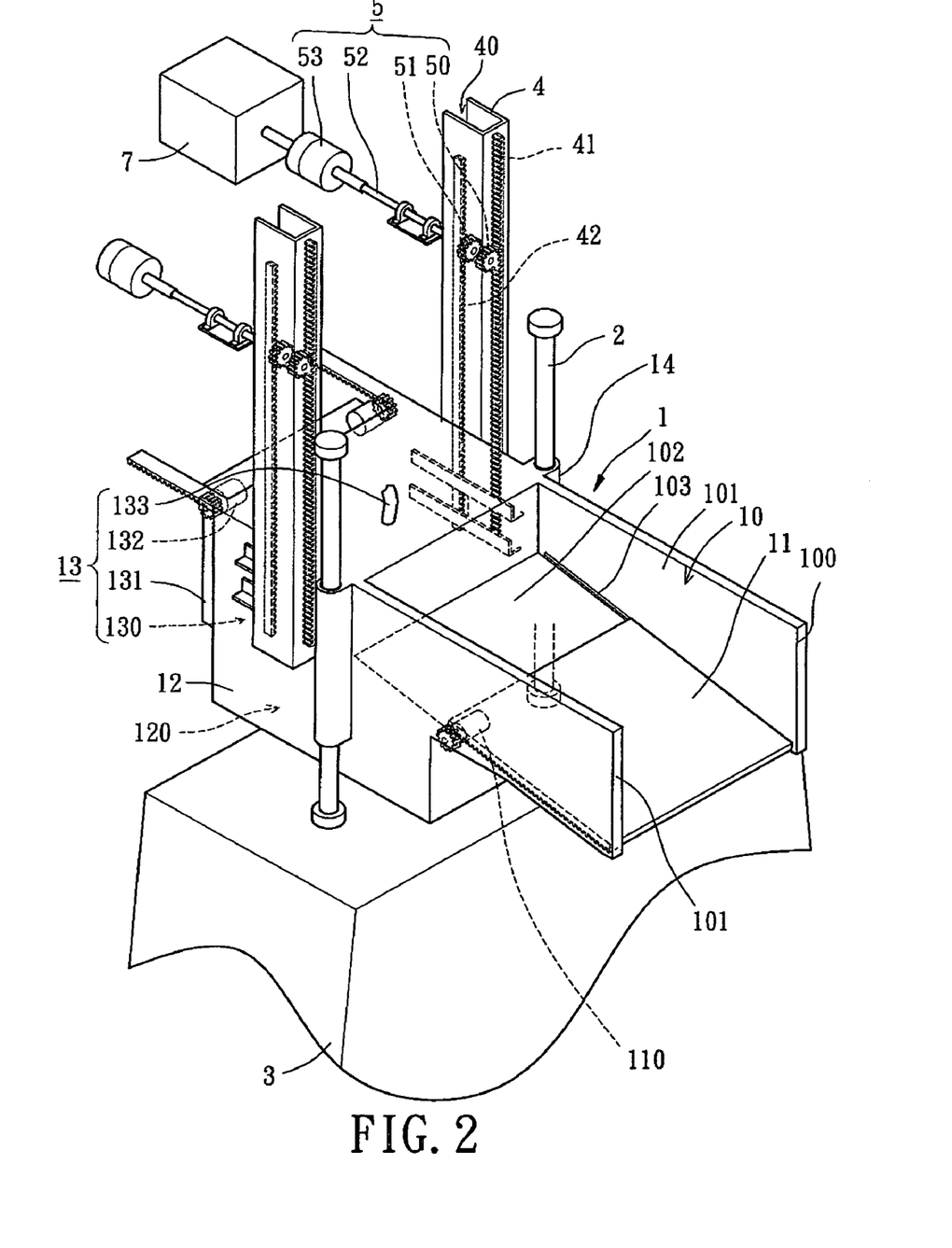
FIG. 2 is a perspective view illustrating the apparatus for wave energy harnessing in accordance with the first embodiment of the present invention.
Figure 3:
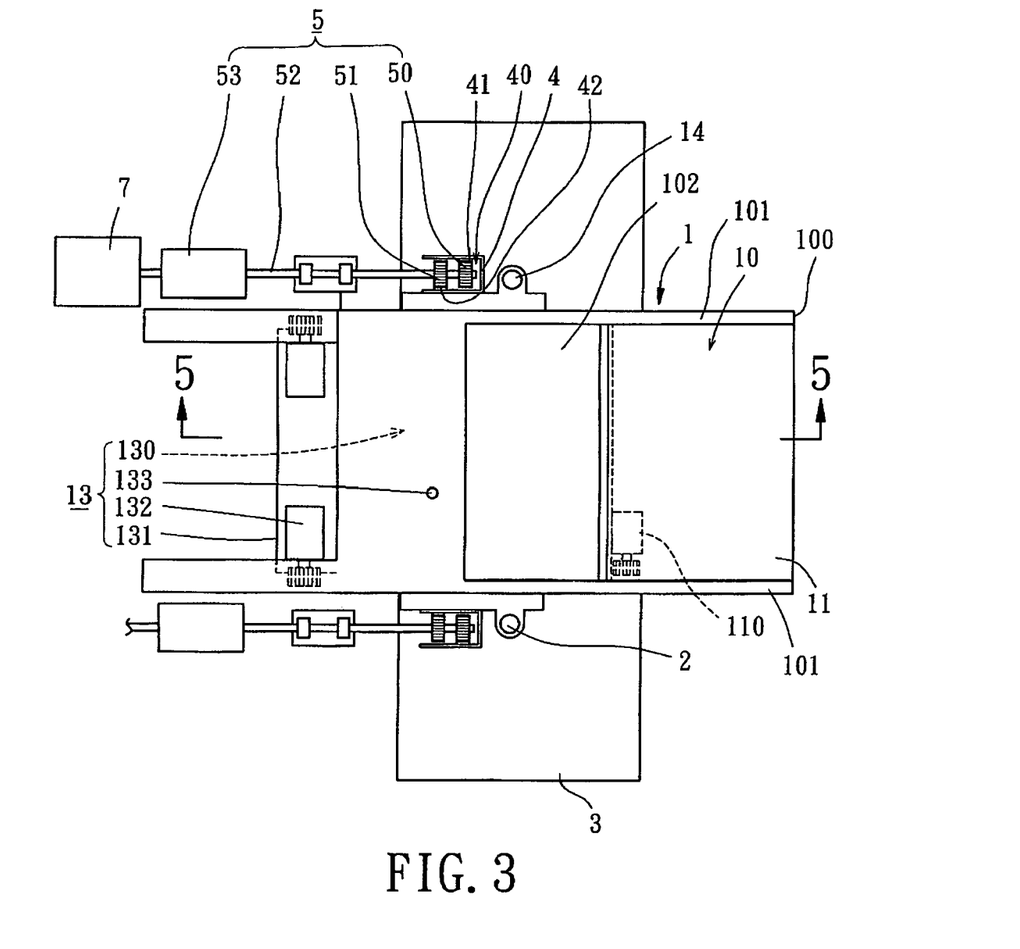
FIG. 3 is a top plan view illustrating the apparatus for wave energy harnessing in accordance with the first embodiment of the present invention.
Figure 4:
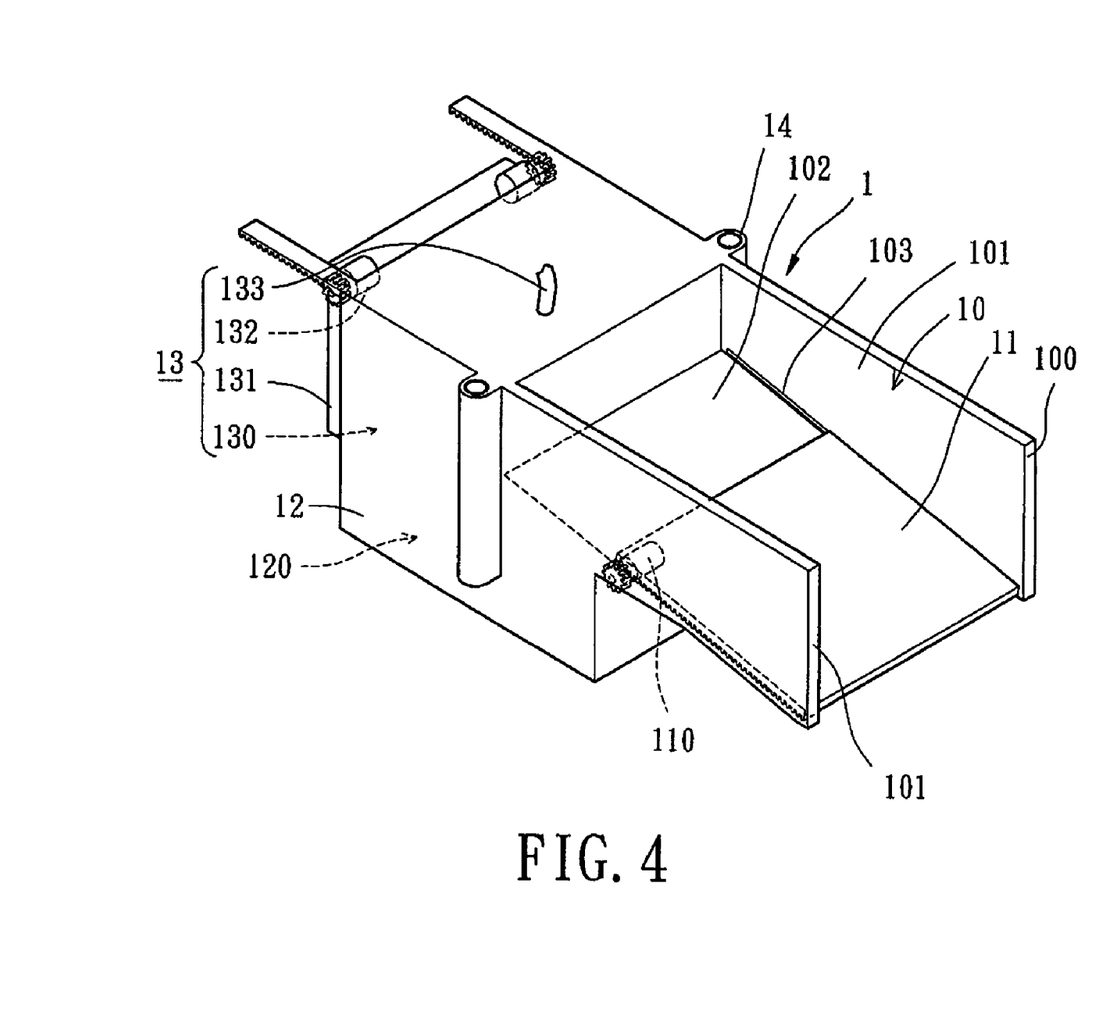
FIG. 4 is a perspective view illustrating a buoyant unit of the apparatus for wave energy harnessing in accordance with the first embodiment of the present invention.

Referring now to FIGS. 1 through 3, schematic, perspective and top plan views of an apparatus for wave energy harnessing in accordance with the first embodiment of the present invention are illustrated. In the first embodiment, the apparatus includes a buoyant unit 1, at least one slide shaft 2, a base 3, at least one energy-transmitting unit 4 and at least one rotate unit 5. The buoyant unit 1 has a specific gravity lower than that of water for floating on water. One end of the at least one slide shaft 2 is fixed on the base 3 and is provided for the buoyant unit 1 to slide along, with the number of the at least one slide shaft 2 being two in said first embodiment. The base 3 is mounted on seabed. The at least one energy-transmitting unit 4 is arranged on at least one surface of the buoyant unit 1, with the number of the at least one energy-transmitting unit 4 also being two in said first embodiment for being disposed at two ends of the buoyant unit 1. The at least one rotate unit 5 connects to the at least one energy-transmitting unit 4, and the number of the at least one rotate unit 5 corresponds to the number of the at least one energy-transmitting unit 4; namely two in the first embodiment. Therefore, when the buoyant unit 1 slides upward or downward along the slide shafts 2, a translational kinetic energy of the buoyant unit 1 is transformed into a rotational kinetic energy of the rotate units 5 though the energy-transmitting units 4 for practical applications such as generation of electricity.

Turning now to FIGS. 2 through 5, the buoyant unit 1 comprises a reservoir 10, an adjusting board 11, a sealed box 12, an adjusting tank 13 and at least one engaging member 14. Particulary referring to FIG. 3, the reservoir 10 is formed at a side of the buoyant unit 1. The reservoir 10 has an opening 100 connecting to an interior space of the reservoir 10 for water to flow thereinto; two lateral walls 101 protruding from a lateral end of the buoyant unit 1 in parallel; a bottom wall 102 partially linking two edges of the two lateral walls 101 to define the interior space of the reservoir 10 with said lateral walls 101; and two guiding grooves 103 respectively arranged at the two lateral walls 101 and opposite to each other, with the guiding grooves 103 extending along edges of the lateral walls 101 that connect with the bottom wall 102. The adjusting board 11 moveably engages with the lateral walls 101, with two opposite edges of the adjusting board 11 inserted into the guiding grooves 103, such that the adjusting board 11 can slide along the guiding grooves 103 in the reservoir 10 without falling off.

Figure 5:
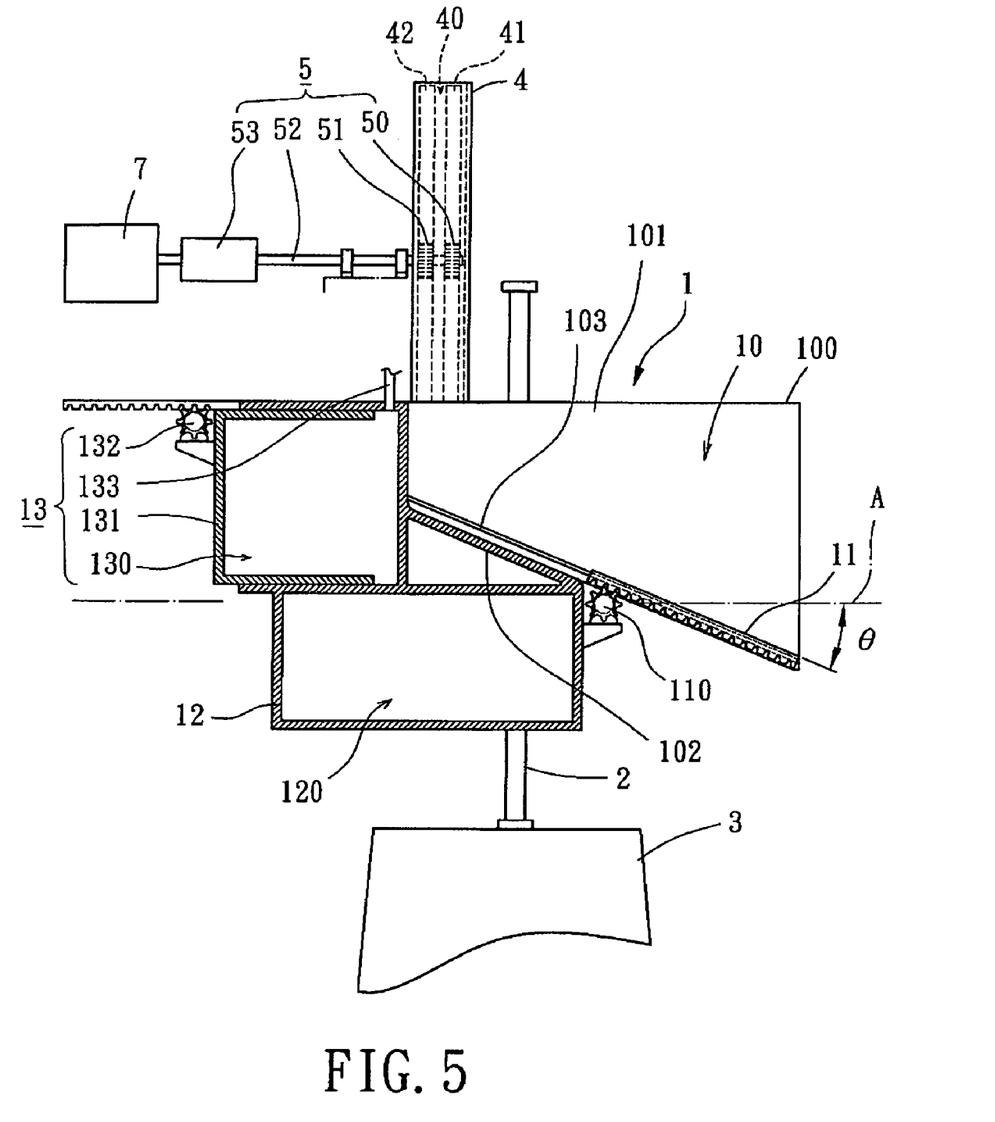
FIG. 5 is a cross-sectional view along the line 5-5 in FIG. 3, which illustrates the apparatus for wave energy harnessing in accordance with the first embodiment of the present invention.

The adjusting board 11 extends in a direction that provides an angle of inclination about sea level "A", which is designated as θ in FIG. 5, and is controlled by a control unit 110 that is adjacent to the adjusting board 11 for moving along the guiding grooves 103. The angle θ lays between 1 degree and 45 degrees, and is preferably 45 degrees. Through a control over said adjusting board 11, the adjusting board 11 further protrudes into water under the sea lever "A". Thereby, a contact surface area, which is disposed between the buoyant unit 1 and water, and a capacity of the reservoir 10 are adjustable, so as to harness the wave energy in a more effective way. The sealed box 12 is arranged at a bottom of the buoyant unit 1 with a space 120 disposed inside to provide predetermined buoyancy for the buoyant unit 1 to float on water.

Relative to the reservoir 10, the adjusting tank 13 is disposed at another side of the buoyant unit 1 and is unsealed. The adjusting tank 13 has an inner space 130, a moving member 131, a control unit 132, and a through hole 133. The inner space 130 is defined in the adjusting tank 13. The moving member 131 forms a side of the adjusting tank 13 and can be moved relatively to other sides of the adjusting tank 13, with the control unit 132 actuating the moving member 131 to proceed the movement, so as to adjust the size of the inner space 130. The through hole 133 is formed at a side, preferably a top side, of the adjusting tank 13 for the inner space 130 to connect with the air outside the buoyant unit 1, so as to maintain the equilibrium of air pressure outside and inside the adjusting tank 13. Therefore, the buoyancy of the buoyant unit 1 is adjustable, and thus the vertical moving speed of the buoyant unit 1 is controllable.

The at least one engaging member 14 is moveably engaged with the at least one slide shaft 2, with the number of the at least one engaging member 14 corresponding to that of the at least one slide shaft 2; namely, the number of the at least one engaging member 14 is two in said first embodiment. The two engaging members 14 are preferably formed at two opposite sides of the buoyant unit 1 for balance, and each engaging member 14 has a linear bearing surrounding a radial circumference of the shde shaft 2 as a sleeve thereof for the engaging member 14 to slide along the slide shaft 2.

Referring to FIGS. 2 through 5 again, the at least one energy-transmitting unit 4 is mounted on at least one side of the buoyant unit 1 with the number of the at least one energy-transmitting unit 4 being two preferably. Each of the energy-transmitting units 4 comprises a channel 40, a first rack member 41, and a second rack member 42. The energy-transmitting unit 4 further provides a pair of opposite sidewalls (unlabeled) parallel to each other and extending vertically, with the channel 40 being delimited between those sidewalls. The first and second rack members 41, 42 are mounted on inner surfaces of the opposite sidewalis respectively and are mis-aligned with each other.

Still referring to FIGS. 2 through 5, the at least one rotate unit 5 comprises a first one-way gear 50, a second one-way gear 51, a transmission shaft 52, and a coupler 53. The one-way gears 50, 51 can be driven in a predetermined rotational direction; namely, each one-way gear 50, 51 permits an idle rotation in a designated direction. The first one-way gear 50 and the second one-way gear 51 are coaxially arranged on the transmission shaft 52, with the first and second one-way gears 50, 51 being mounted at one end of the transmission shaft 52 and the coupler 53 being mounted at the other end thereof The coupler 53 further connects to an energy-transfonning unit 7 such as a generator. In assembly, the transmission shaft 52 is extended into the channel 40 of the energy-transmitting unit 4. The two one-way gears 50, 51 are received in the channel 40, and the first one-way gear 50 engages with the first rack member 41 while the second one-way gear 51 engages with the second rack member 42. In detail, the idle rotational directions of the first one-way gear 50 and the second one-way gear 51 are opposite such that one of the first one-way gear 50 and the second one-way gear 51 is driven while the other one is idle. The transmission shaft 52 mechanically connects with the energy-transforming unit 7 through the coupler 53.

Figure 6:
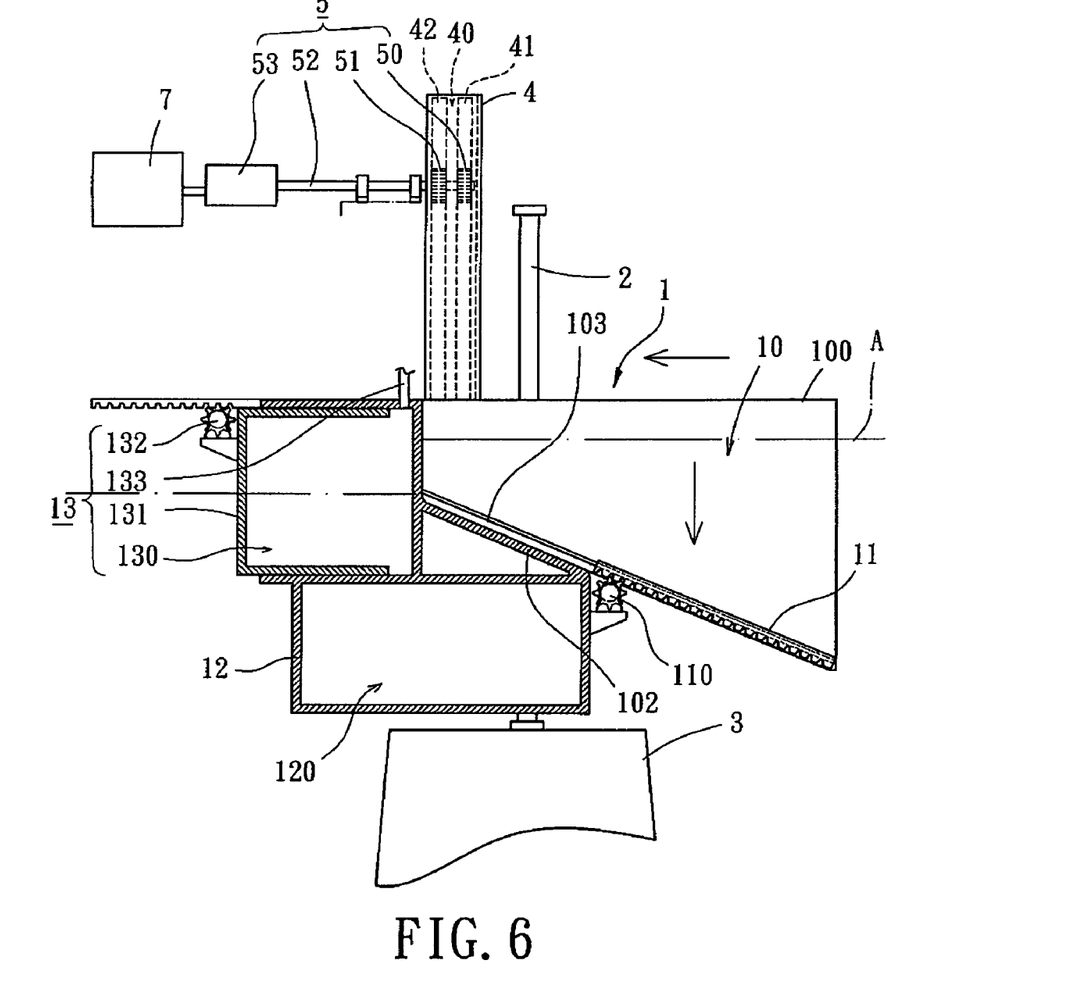
FIG. 6 is a cross-sectional view illustrating a downward movement of the buoyant unit in accordance with the first embodiment of the present invention.

Turning now to FIG. 6, when a water current flows toward the reservoir 10, the control unit 110 moves the adjusting board 11 relatively to the bottom walt 102 to further protrude into water under the sea level "A". Therefore, the buoyant unit 1 provides an enlarged area that faces the water current and is jointly formed by the bottom wall 102 and adjusting board 11. Thus, the protruded adjusting board 11 increases a pushing force, which is induced by the water current, pressing the buoyant unit 1 downward. Moreover, the protruded adjusting board 11 also increases the capacity of the reservoir 10 to increase a total weight of the reservoir 10 and water therein, so as to generate an increased gravity force thereof As a result, when the gravity force is larger than the buoyancy caused by the space 120 and inner space 130, the buoyant unit 1 can quickly dive along the slide shafts 2 owing to the increased gravity force and pushing force. Through the downward movement of the buoyant unit 1, the first and second rack members 41, 42 also move downward with the buoyant unit 1 and turn the first and second one-way gears 50, 51, with the first one-way gear 50 rotating the transmission shaft 52 and the second one-way gear 51 being idle.

Figure 7:
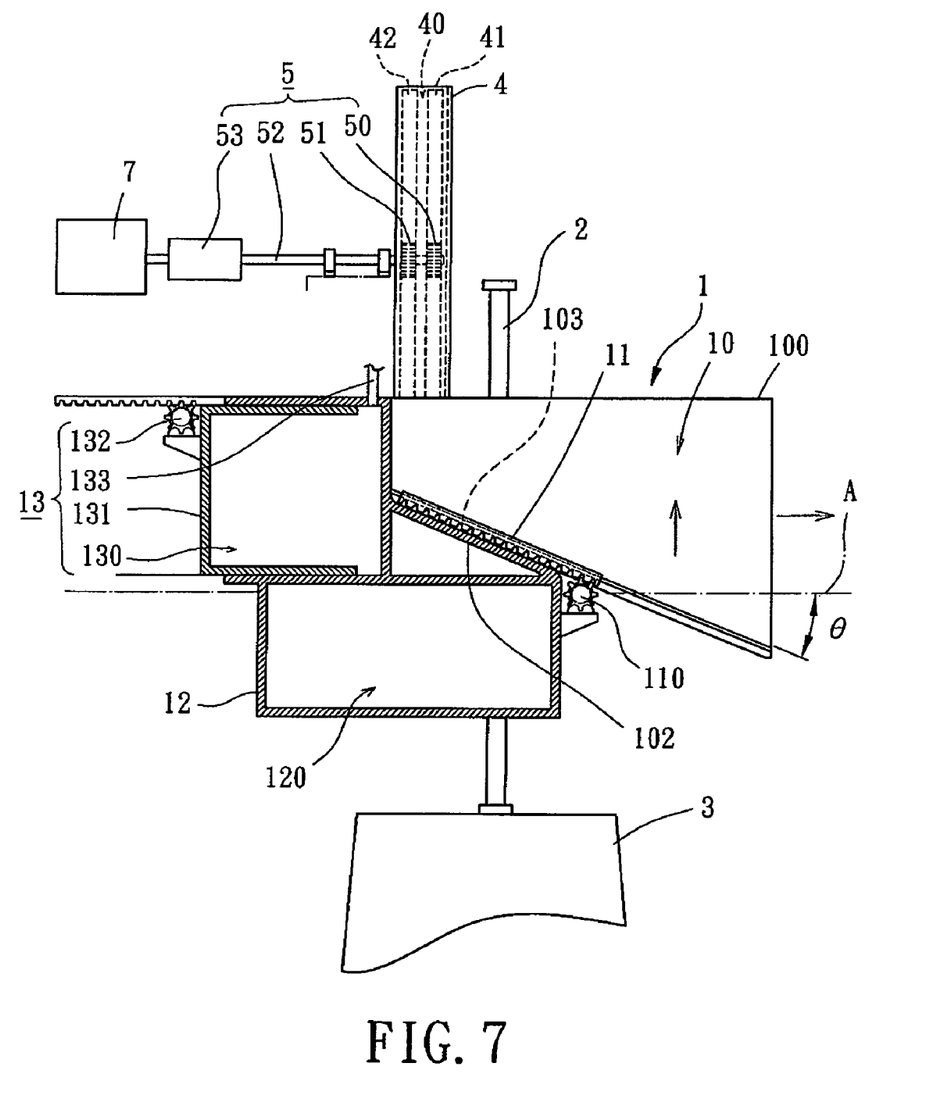
FIG. 7 is a cross-sectional view illustrating an upward movement of the buoyant unit in accordance with the first embodiment of the present invention.

Turning now to FIG. 7, when the water current leaves the reservoir 10 in a reverse direction, the control unit 110 moves the adjusting board 11 relatively to the bottom wall 102 to shrink back to a position overlapping the bottom wall 102. Therefore, the area facing the water current is shrunk, and, thus, a floating resistance against the movement of the buoyant unit 1 is reduced. Moreover, the shrunk adjusting board 11 also decreases the capacity of the reservoir 10 to decrease a total weight of the reservoir 10 and water therein, so as to cause a decreased gravity force thereof. As a result, when the gravity force is smaller than the buoyancy caused by the space 120 and inner space 130, the buoyant unit 1 can quickly float along the slide shafts 2 owing to the decreased gravity force and floating resistance. Though the upward movement of the buoyant unit 1, the first and second rack members 41, 42 also move upward with the buoyant unit 1 and turn the first and second one-way gears 50, 51, with the first one-way gear 50 being idle and the second one-way gear 51 rotating the transmission shaft 52. Therefore, no matter whether the buoyant unit 1 moves upward or downward, the transmission shaft 52 is rotated in the same rotating direction, and the energy-transforming unit 7 may continuously generate power.

Figure 8:
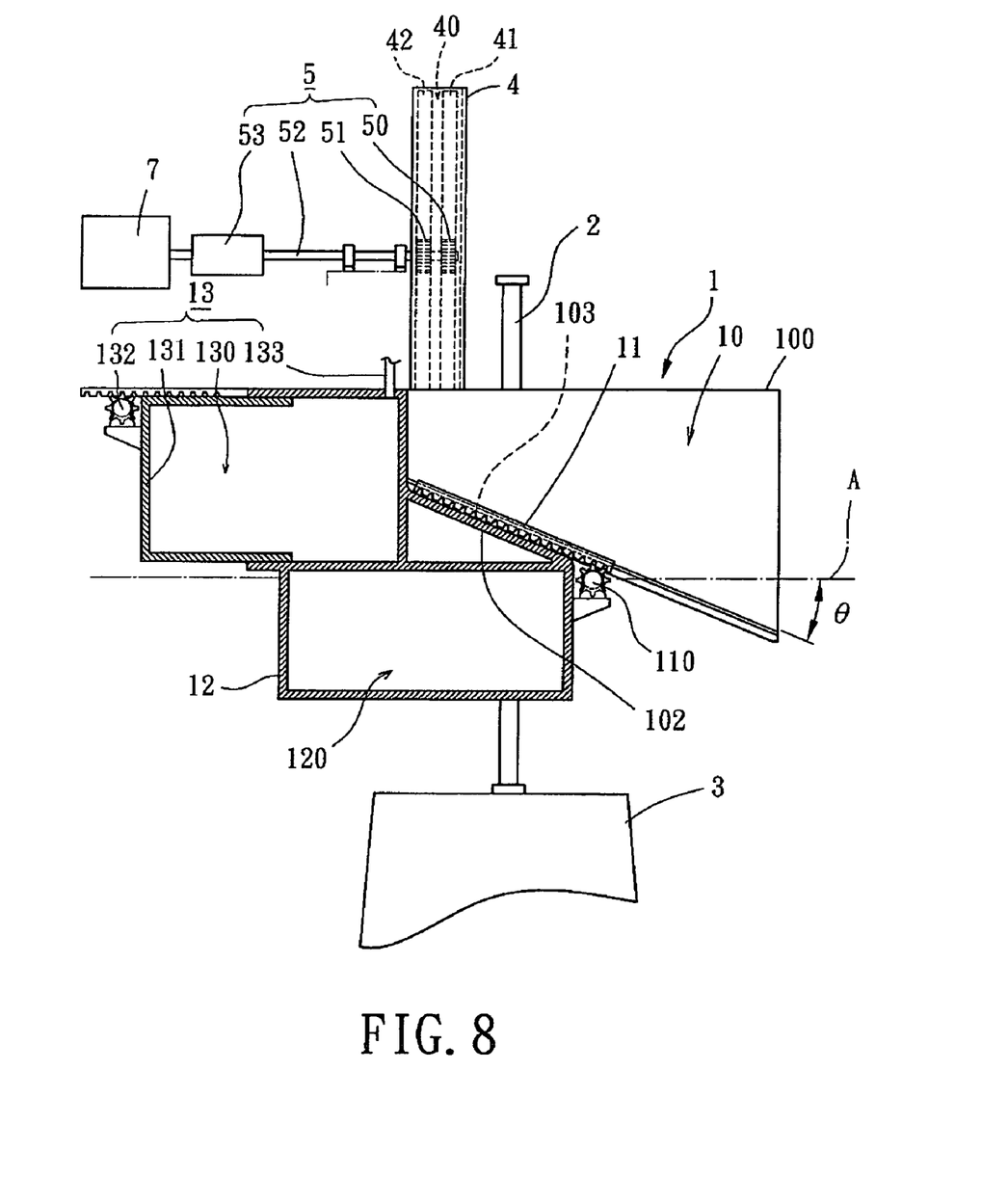
FIG. 8 is a cross-sectional view illustrating an enlarged inner space of an adjusting tank in accordance with the first embodiment of the present invention.

Moreover, as shown in FIG. 8, according to the size of the wave, the upward or downward speed of the buoyant unit 1 can be designed within a predetermined range by the adjusting tank 13. For example, when the wave is large, the control unit 132 moves the moving member 131 of the adjusting tank 13 to increase the capacity of the inner space 130 in case the buoyant unit 1 sinks too fast. As a result, a function to keep the buoyant unit 1 moving at regular speeds whether the wave is large or small is achieved.

Figure 9:
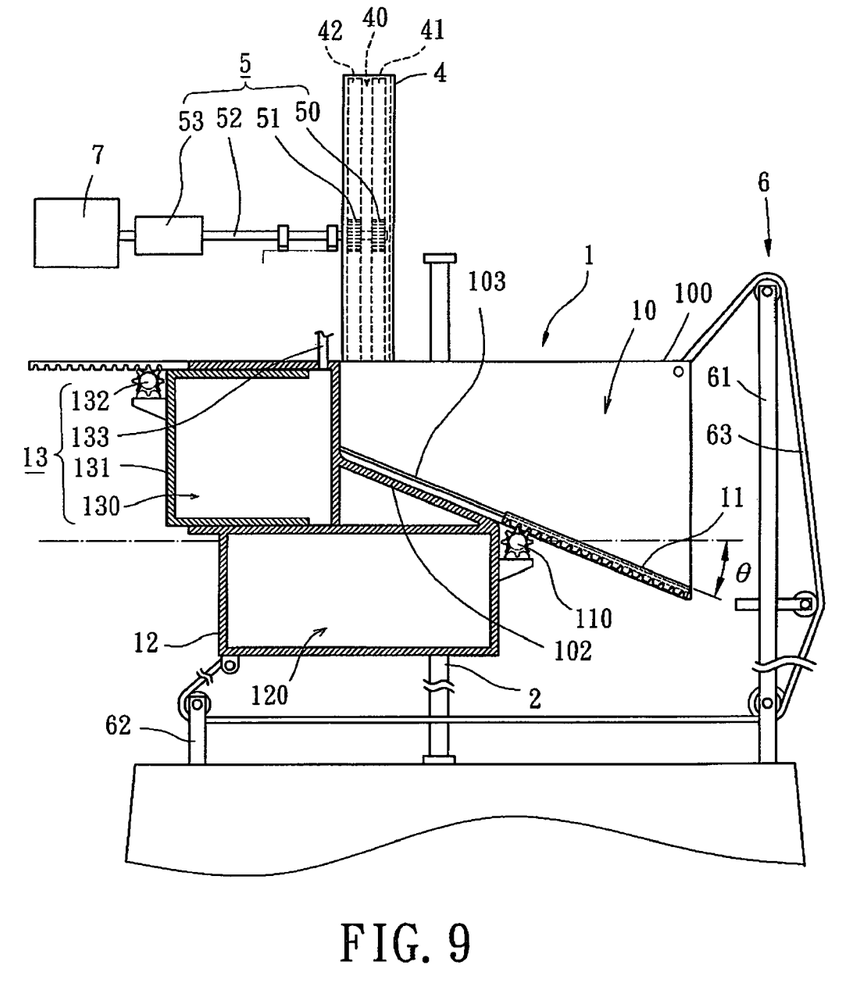
FIG. 9 is a cross-sectional view illustrating the apparatus for wave energy harnessing in accordance with the second embodiment of the present invention.
Figure 10:
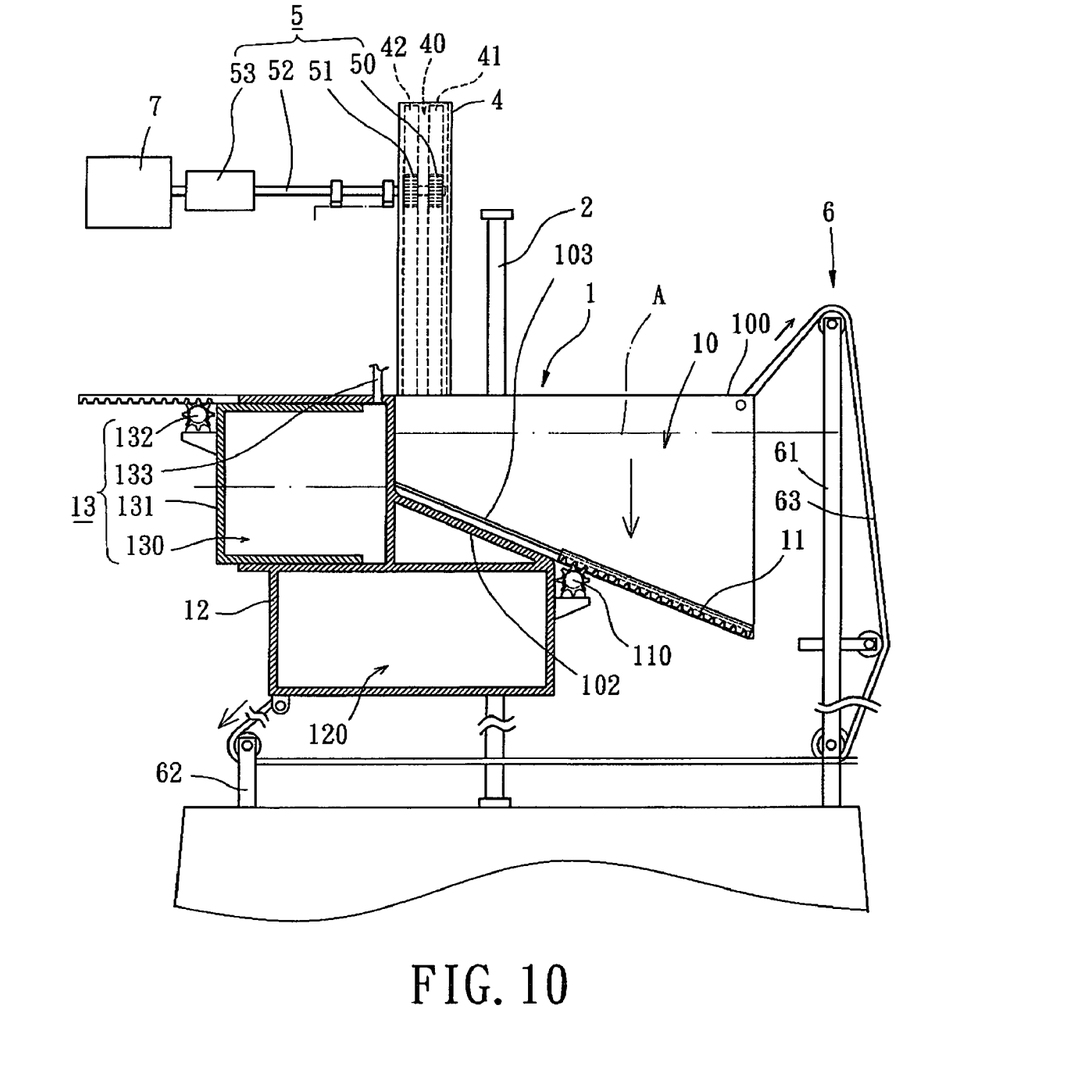
FIG. 10 is a schematic view illustrating the balanced buoyant unit in accordance with the second embodiment of the present invention.

Now referring to FIG. 9, a cross-sectional view schematic of an apparatus for wave energy harnessing in accordance with the second embodiment of the present invention is illustrated. In comparison with the first embodiment, a stabilization unit 6 is applied in said second embodiment, which has a first frame 61, a second frame 62, and a rope 63. The first and second frames 61, 62 are firmly mounted on the base 3, with a plurality of pulleys (unlabelled) being rotatably coupled to the two frames 61, 62. Two ends of the rope 63 are fixed to the buoyant unit 1, preferabty to an upper side of the reservoir 10 and a lower side of the sealed box 12, with the rope 63 winding across said pulleys and preferably being an elastic rope. As shown in FIG. 10, in operation, the buoyant unit 1 may easily incline relatively to the sea level "A" owing to a force caused by the water current flowing toward the reservoir 10, which induces a movement of the buoyant unit 1, not smoothly but roughly. Through the stabilization unit 6, the degree of inclination is reduced, and the buoyant unit 1 can slide along the slide shaft 2 smoothly under the force caused by the water current.

As has been discussed above, the conventional power generating apparatus has a complicated structure so that there are difficulties in assembly and maintenance. Furthermore, the conventional power generating apparatus causes an inconsistent movement among the slide shafts that affects the movement of the buoyant float unit. Conversely, the apparatus for wave energy harnessing in accordance with the present invention provides the at least one slide shaft 2 mounted on a seabed through the base 3, with the translational kinetic energy of the buoyant unit 1 being transformed into the rotational kinetic energy of the rotate units 5 through the energy-transmitting units 4.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. An apparatus for wave energy harnessing comprising:
at least one slide shaft mounted on a seabed;
a buoyant unit movably engaged with the slide shaft and providing buoyancy;
a reservoir formed at a side of the buoyant unit, with the reservoir comprising an adjusting board moveably engaging within the reservoir and increasing capacity of the reservoir, with the adjusting board extending in a direction providing an angle of inclination about sea level;
an energy-transmitting unit mounted on the buoyant unit; and
a rotate unit rotatably engaging with the energy-transmitting unit and connecting to an energy-transforming unit though a transmission shaft;
wherein, with the buoyant unit sliding along the at least one slide shaft, the energy-transmitting unit rotates the transmission shaft of the rotate unit and thus the energy-transforming unit generates power.

2. The apparatus for wave energy harnessing as defined in claim 1, wherein the reservoir further comprises two lateral walls protruding from a lateral end of the buoyant unit and a bottom wall partially linking two edges of the two lateral walls to define an interior space of the reservoir with said lateral walls, with two guiding grooves respectively arranged at the two lateral walls and opposite to each other for engaging with the adjusting board.

3. The apparatus for wave energy harnessing as defined in claim 2, wherein the buoyant unit further comprises a control unit to control the adjusting board moving relatively to the bottom wall.

4. The apparatus for wave energy harnessing as defined in claim 1, wherein the angle of inclination lays between 1 degree and 45 degrees.

5. The apparatus for wave energy harnessing as defined in claim 1, wherein the buoyant unit further comprises a sealed box arranged at a bottom of the buoyant unit with a space disposed inside to provide predetermined buoyancy for the buoyant unit.

6. The apparatus for wave energy harnessing as defined in claim 1, wherein the buoyant unit further comprises an adjusting tank having an inner space and including a moving member and a control unit, with the moving member forming a side of said adjusting tank and the control unit moving the moving member relatively to other sides of said adjusting tank to adjust sizing of the inner space of the adjusting tank.

7. The apparatus for wave energy harnessing as defined in claim 1, wherein a number of the at least one slide shaft is two, and the two slide shafts are mounted to the seabed through a base, with said two slide shafts engaging with two opposite sides of the buoyant unit.

8. The apparatus for wave energy harnessing as defined in claim 1, wherein at least one gear is mounted at an end of the transmission shaft of the rotate unit and at least one rack member is mounted on the energy-transmitting unit, with said gear engaging wit the at least one rack member.

9. The apparatus for wave energy harnessing as defined in claim 8, wherein the at least one rack member comprises a first rack member and a second rack member, with the first and second rack members being respectively mounted on inner surfaces of two opposite sidewalls of the energy-transmitting unit and being mis-aligned with each other.

10. The apparatus for wave energy harnessing as defined in claim 9, wherein the at least one gear comprises a first gear and a second gear, with the first and second gears being arranged between said two opposite sidewalk and engaging with the first and second rack members respectively.

11. The apparatus for wave energy harnessing as defined in claim 10, wherein the first and second gears are selected as one-way gears.

12. An apparatus for wave energy harnessing comprising;
at least one slide shaft mounted on a seabed through a base;
a buoyant unit movably engaged with the slide shaft and having a reservoir formed at a side of the buoyant unit and an adjusting board moveably engaging within the reservoir, with the adjusting board extending in a direction providing an angle of inclination about sea level;
an energy-transmitting unit mounted on the buoyant unit;
a rotate unit rotatably engaging with the energy transmitting unit and connecting to an energy-transforming unit through a transmission shaft;
a stabilization unit having a first frame, a second frame, and a rope, wherein the first and second frames are firmly mounted on the base and have a plurality of pulleys rotatably coupled thereon, and two ends of the rope are fixed to the buoyant unit, with the rope winding across said pulleys;
wherein, with the buoyant unit sliding along the at least one slide shaft, the energy-transmitting unit rotates the transmission shaft of the rotate unit and thus the energy-transforming unit generates power.

13. The apparatus for wave energy harnessing as defined in claim 12, wherein a number of the at least one slide shaft is two, with said two slide shafts engaging with two opposite sides of the buoyant unit.

* * * * *